(12) United States Patent
Schmidt et al.

(10) Patent No.: US 6,984,467 B2
(45) Date of Patent: Jan. 10, 2006

(54) PLASMA SPRAYED CERIA-CONTAINING INTERLAYER

(75) Inventors: Douglas S. Schmidt, North Attleboro, MA (US); George R. Folser, Lower Burrell, PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 397 days.

(21) Appl. No.: 10/253,469

(22) Filed: Sep. 24, 2002
(Under 37 CFR 1.47)

(65) Prior Publication Data
US 2004/0058225 A1    Mar. 25, 2004

(51) Int. Cl.
*H01M 4/86*    (2006.01)
(52) U.S. Cl. .......................... 429/41; 429/32; 429/44; 429/45
(58) Field of Classification Search .................. 429/32, 429/41, 44, 45
See application file for complete search history.

(56) References Cited

U.S. PATENT DOCUMENTS

| | | |
|---|---|---|
| 3,220,068 A | 11/1965 | Geisen, Jr. |
| 3,591,759 A | 7/1971 | Stand |
| 3,823,302 A | 7/1974 | Muehlberger |
| 3,839,618 A | 10/1974 | Muehlberger |
| 4,049,841 A | 9/1977 | Coker et al. |
| 4,330,568 A | 5/1982 | Boehm et al. |
| 4,582,766 A | 4/1986 | Isenberg et al. |
| 4,597,170 A | 7/1986 | Isenberg |
| 4,598,467 A | 7/1986 | Isenberg et al. |
| 4,609,562 A | 9/1986 | Isenberg et al. |
| 4,847,172 A | 7/1989 | Maskalick et al. |
| 4,853,250 A | 8/1989 | Boulos et al. |
| 4,971,830 A | 11/1990 | Jensen |
| 5,035,962 A | 7/1991 | Jensen |
| 5,085,742 A | 2/1992 | Dollard et al. |
| 5,106,706 A | 4/1992 | Singh et al. |
| 5,234,722 A | 8/1993 | Ito et al. |
| 5,418,081 A | 5/1995 | Kawasaki et al. |
| 5,426,003 A | 6/1995 | Spengler et al. |
| 5,480,739 A | 1/1996 | Kawasaki et al. |
| 5,516,597 A | 5/1996 | Singh et al. |
| 5,527,633 A | 6/1996 | Kawasaki et al. |
| 5,529,856 A | 6/1996 | Petri et al. |
| 5,716,422 A | 2/1998 | Muffoletto et al. |
| 5,908,713 A | 6/1999 | Ruka et al. |
| 5,985,476 A | 11/1999 | Wachsman et al. |
| 5,993,989 A | 11/1999 | Baozhen et al. |
| 6,139,985 A | 10/2000 | Borglum et al. |
| 6,248,468 B1 | 6/2001 | Ruka et al. |
| 6,492,051 B1 * | 12/2002 | Gopalan et al. ............... 429/41 |

\* cited by examiner

*Primary Examiner*—Laura Weiner

(57) ABSTRACT

A plasma sprayed ceria-containing interlayer is provided. The interlayer has particular application in connection with a solid oxide fuel cell used within a power generation system. The fuel cell advantageously comprises an air electrode, a plasma sprayed interlayer disposed on at least a portion of the air electrode, a plasma sprayed electrolyte disposed on at least a portion of the interlayer, and a fuel electrode applied on at least a portion of the electrolyte.

20 Claims, 5 Drawing Sheets

| Location | At% O | At% Ca | At% Mn | At% Ni | At% Y | At% Zr | At% La |
|---|---|---|---|---|---|---|---|
| Spot a | 60.80 | 3.81 | 18.19 | 0.52 | 0.00 | 0.00 | 15.12 |
| Spot b | 62.53 | 1.97 | 2.48 | 0.23 | 3.53 | 17.78 | 7.33 |
| Spot c | 63.25 | 1.73 | 1.21 | 0.15 | 5.81 | 23.01 | 1.66 |
| Spot d | 65.50 | 1.32 | 1.71 | 0.08 | 5.14 | 24.03 | 1.18 |
| Spot e | 64.23 | 1.22 | 1.91 | 0.13 | 5.40 | 25.90 | 0.78 |
| Spot f | 64.25 | 0.63 | 1.60 | 0.07 | 6.68 | 25.92 | 0.45 |

CATHODE: $\frac{1}{2} O_2 + 2e^- \longrightarrow O^=$
ANODE: $H_2 + O^= \longrightarrow H_2O + 2e^-$ CELL: $H_2 + \frac{1}{2} O_2 \longrightarrow H_2O$
$(CO + \frac{1}{2} O_2 \longrightarrow CO_2)$

PLASMA SPRAYED CERIA-CONTAINING INTERLAYER

GOVERNMENT RIGHTS STATEMENT

This invention was conceived under United States Department of Energy Contract No. DE-FC26-97FT-34139. The United States government has certain rights hereunder.

FIELD OF THE INVENTION

The present invention relates in general to the fields of plasma spraying and ceria-containing interlayers and, in particular, to a method of forming a solid oxide fuel cell used within a power generation system by plasma spraying a ceria-containing interlayer onto an underlying air electrode and then plasma spraying an electrolyte onto the ceria-containing interlayer.

BACKGROUND OF THE INVENTION

Figure 1:
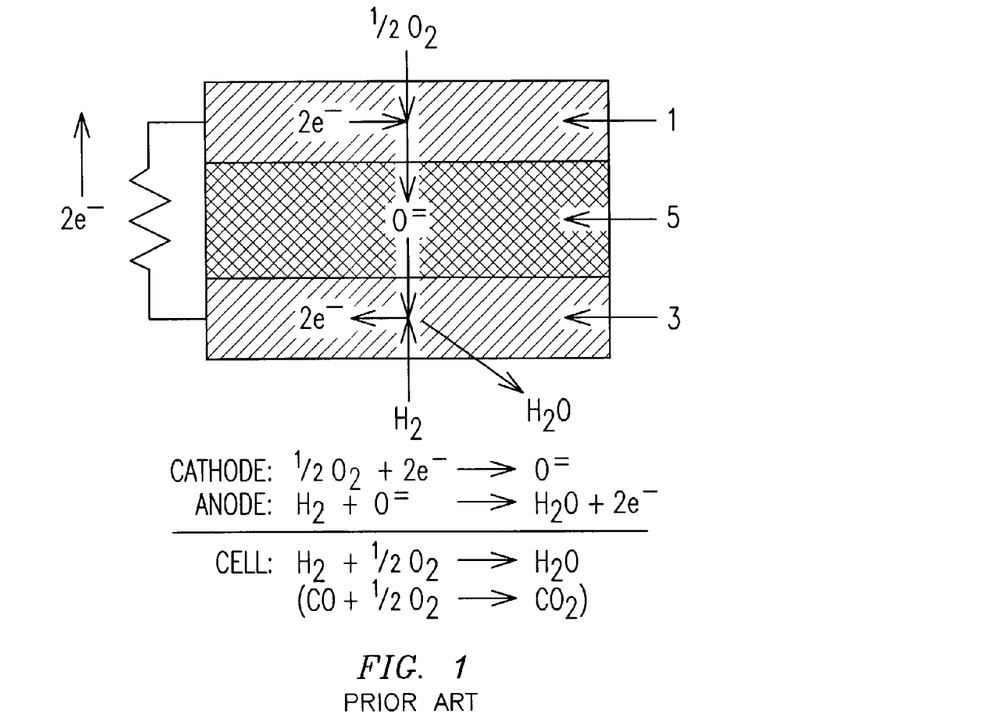
FIG. 1 is an illustration an exemplary known electrochemical reaction within a fuel cell.

A fuel cell converts chemical energy directly into electrical energy. Most fuel cells comprise a cathode or air electrode 1 and an anode or fuel electrode 3, separated by an electrolyte 5 (FIG. 1). At the air electrode 1, oxygen is ionized and the oxide ions migrate through the electrolyte to the fuel electrode 3. At the fuel electrode 3, hydrogen is ionized and the hydrogen ions react with the oxide ions to form water and release electrons. The released electrons then travel from the fuel electrode 3 to the air electrode 1 through a load-containing connection, thereby completing the circuit and providing a small amount of direct electrical current. It is well known in the art that ion quantities can vary, additional or other ion constituents can be used, and ion and electron directions can be reversed.

A fuel cell based power generation system typically comprises a plurality of electrically interconnected fuel cells. The system usually uses a hydrogen-bearing fuel (e.g. natural gas, methane, hydrogen) at the anode, and an oxidant (e.g. air, oxygen) at the cathode. A schematic arrangement of one such system, which uses solid oxide electrolyte fuel cells (SOFC), is described in U.S. Pat. No. 4,395,468.

Because fuel cells are efficient, use plentiful and renewable fuels, do not require direct combustion and produce low emissions, they are a very attractive energy source. However, although the basic electrochemical processes and schematic arrangements of fuel cell based power generation systems are well understood, engineering solutions necessary to lower fabrication costs and make such systems an economical alternative to fossil fuel and other power generation systems remain elusive.

One technical problem with conventional fuel cells involves the application of the interlayer to the air electrode. The applied interlayer should advantageously possess and maintain certain properties during a lifetime of operation under fuel cell operating conditions with various fuels, including varying temperatures (e.g. about 25–1200° C., preferably about 700–1000° C.) and pressures (e.g. about 0.5–5 atm, preferably about 1–3 atm). These properties include: high electrical conductivity, large electrochemically active interface area, oxidant permeability, the ability to inhibit degradation of the air electrode by halide vapors, the ability to inhibit long term metal diffusion from the air electrode to the electrolyte, the ability to at least partially infiltrate into the underlying air electrode substrate, strong adherence to the underlying substrate and interconnect, good chemical and physical stability, thermal cyclability, good ion transfer, and low fabrication costs.

One popular type of interlayer composition is a ceria-containing interlayer such as those described in U.S. Pat. Nos. 5,106,706, 5,516,597, and 6,139,985. A successful process used to apply such an interlayer onto an underlying air electrode substrate involves applying a liquid or slurry interlayer material onto the air electrode, followed by a drying step to remove excess liquid or slurry, and then a sintering cycle to densify the interlayer, such as those described in U.S. Pat. Nos. 4,547,437, 4,598,467, 5,106,706 and 5,516,597. This process produces an interlayer that can generally meet the above-described technical properties, but which is quite expensive and time-consuming to manufacture. For example, such a process requires a costly and time consuming three-step application process.

Another popular method of applying an interlayer onto an air electrode involves electro-chemical vapor deposition (EVD) of gaseous reactants, such as those described in U.S. Pat. Nos. 4,597,170, 4,609,562, 5,993,989 and 6,139,985. However, like with the liquid infiltration and slurry coating techniques, although the EVD process can be used to successfully produce an interlayer that at least partially infiltrates into the air electrode and generally meets above-described technical properties, it is quite expensive and time-consuming.

Other attempts to reduce interlayer fabrication costs include plasma spraying (e.g. air plasma spraying "APS", vacuum plasma spraying "VPS", plasma arc spraying, flame spraying) which generally involves spraying a molten powdered metal or metal oxide onto an underlying substrate surface using a plasma thermal spray gun to form a deposited layer having a microstructure generally characterized by accumulated molten particle splats. Plasma spraying techniques are described in U.S. Pat. Nos. 3,220,068, 3,839,618, 4,049,841, and U.S. Pat. Nos. 3,823,302 and 4,609,562 generally teach plasma spray guns and use thereof. Although plasma spraying has been used for fabrication of certain fuel cell layers, such as those described in U.S. Pat. Nos. 5,085,742, 5,085,742, 5,234,722 5,527,633 (plasma sprayed electrolyte) U.S. Pat. No. 5,426,003 (plasma sprayed interconnect), U.S. Pat. No. 5,516,597 (plasma sprayed interlayer) U.S. Pat. No. 5,716,422 (plasma sprayed air electrode) and Invention Registration No. H1260 (plasma sprayed air electrode, electrolyte and fuel electrode), use of such plasma spraying techniques have been of limited value when used to apply an interlayer onto an underlying substrate because they cause the interlayer to infiltrate into the air electrode rather than remaining on the air electrode surface. Moreover, these conventional plasma spraying techniques make it extremely difficult, if not impossible, to apply the interlayer as a thin uniform layer, which is important for efficient fuel cell resistance and other reasons.

Another shortcoming of known plasma sprayed interlayers involves the subsequent application of the electrolyte onto the interlayer. In particular, if an interlayer is plasma sprayed onto the air electrode, then, if the electrolyte is subsequently plasma sprayed onto the interlayer, this second plasma spraying acts as a kind of grit blaster that removes certain portions of the plasma sprayed interlayer. This phenomenon is especially evident with ceria-containing interlayers, as the ceria particles tend to be easily removed by the subsequent plasma spraying of the electrolyte.

Thus, fuel cell fabricators heretofore have been left to choose between one of two unsatisfactory interlayer application methods: either (1) apply the interlayer via a costly infiltration or ECVD technique and then apply the electrolyte via a low cost plasma spraying technique, or (2) apply the interlayer via a low cost plasma spraying technique and then apply the electrolyte via a costly ECVD or infiltration technique.

There is thus a need for an interlayer and a method for making the interlayer that can generally achieve above-described technical properties and can be applied onto an underlying air electrode at a low cost.

SUMMARY OF THE INVENTION

The present invention provides an interlayer and a method for making the interlayer that can generally achieve above-described technical properties and can be manufactured at a low cost. The present invention also provides a method of plasma spraying an interlayer onto an air electrode. The present invention also provides a one-step plasma spray process adapted to form an adherent, halide vapor degradation inhibiting and metal diffusion inhibiting ceria-containing interlayer onto an air electrode.

One aspect of the present invention thus involves a fuel cell comprising, an air electrode and a fuel electrode; an electrolyte arranged between the air electrode and the fuel electrode; and a plasma sprayed interlayer disposed between the air electrode and the electrolyte, the interlayer having a thickness of about 0.1 micron to about 10 microns and weighting about 0.2 gram to about 2 grams, and formed of molten particle splats that adhere to the air electrode.

Another aspect of the present invention involves a fuel cell comprising an air electrode; a plasma sprayed interlayer disposed on at least a portion of the air electrode having a thickness of about 0.1 micron to about 10 microns; a plasma sprayed electrolyte disposed on at least a portion of the interlayer; and a fuel electrode disposed on at least a portion of the electrolyte.

Another aspect of the present invention involves method of manufacturing a fuel cell comprising providing an air electrode; plasma spraying an interlayer onto at least a portion of the air electrode; plasma spraying an electrolyte onto at least a portion of the interlayer; and applying a fuel electrode onto at least a portion of the electrolyte to fabricate the fuel cell.

Further aspects, features and advantages of the present invention will become apparent from the drawings and detailed description of the preferred embodiments that follow.

BRIEF DESCRIPTION OF THE DRAWINGS

The above-mentioned and other concepts of the present invention will now be addressed with reference to the drawings of the preferred embodiments of the present invention. The illustrated embodiments are intended to illustrate, but not to limit the invention. The drawings contain the following figures, in which like numbers refer to like parts throughout the description and drawings and wherein.

DETAILED DESCRIPTION OF THE PREFERRED EMBODIMENTS

Overview

The invention described herein employs several basic concepts. For example, one concept relates to an interlayer that generally meets above-described technical properties and can be manufactured at a low cost. Another concept relates to a method to APS an interlayer onto an air electrode. Another concept relates to a one-step plasma spray process adapted to form an adherent, halide vapor degradation inhibiting and metal diffusion inhibiting ceria-containing interlayer onto an air electrode.

The present invention is disclosed in context of use as a ceria-containing interlayer disposed between an air electrode and electrolyte of a tubular SOFC used within a power generation system. The principles of the present invention, however, are not limited to ceria-containing interlayers disposed between an air electrode and electrolyte, tubular SOFCs, or power generation systems. For example, the principles of the present invention can be used with yttruim chromite-containing interlayers, praseodymium oxide containing interlayers, stabilized zirconia interlayers, and the like. For another example, the principles of the present invention can be used with molten carbonate fuel cells, PEM fuel cells, phosphoric acid fuel cells, planar solid oxide fuel cells, monolithic solid oxide fuel cells, and the like. For another example, the principles of the present invention can be used with electrolysis cells, oxygen separation cells, fuel cell vehicle propulsion systems, fuel cell energy conversion systems, and the like. For another example, the principles of the present invention can be used with interlayers disposed between other fuel cell components, such between the fuel electrode and the electrolyte, between the electrolyte and the air electrode, between the air electrode and the interconnect and the like. One skilled in the art may find additional applications for the apparatus, processes, systems, components, configurations, methods, and applications disclosed herein. Thus, the illustration and description of the present invention in context of an exemplary ceria-containing interlayer disposed between an air electrode and electrolyte of a tubular SOFC for use in a power generation system is merely one possible application of the present invention. However, the present invention has been found particularly suitable in connection with ceria-containing interlayers disposed between an air electrode and electrolyte of tubular SOFCs for use in power generation systems.

Figure 2:
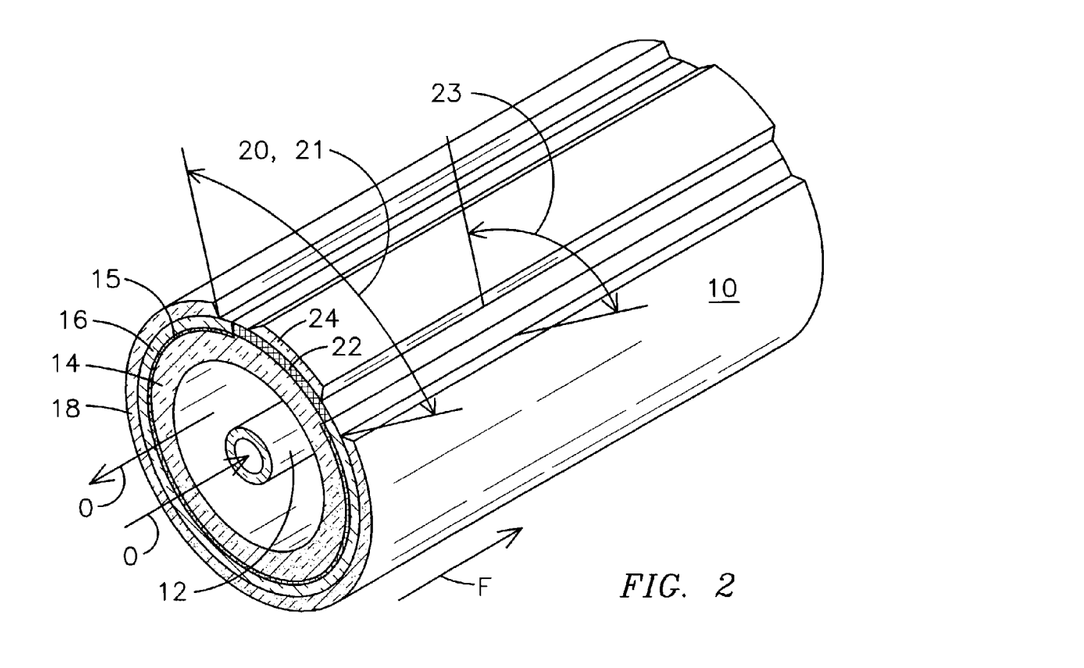
FIG. 2 is a perspective cut view of a portion of an exemplary tubular solid oxide fuel cell of the present invention.

Referring now to FIG. 2, the preferred tubular configuration is based upon a fuel cell system in which a flowing gaseous fuel F is directed axially over the exterior of the fuel cell 10, and a flowing gaseous oxidant O is feed through an optional riser tube 12 positioned within the tubular air electrode 14 and which extends near a closed end of the air electrode 14 such that the oxidant O flows out the riser tube 12 and along the interior length of the fuel cell 10. By this preferred tubular configuration, the fuel F is exposed to the fuel electrode 18 and the oxidant O is exposed to the air electrode 14. Of course, other configurations can be used to expose fuel F to the fuel electrode 18 and oxidant O to the air electrode 14.

Fuel Cell Components

Referring still to FIG. 2, an exemplary tubular solid oxide fuel cell 10 is shown. The fuel cell 10 comprises an air electrode 14 arranged adjacent to an interlayer 15, which, in turn, is arranged adjacent to an electrolyte 16 which, in turn, is arranged adjacent to a fuel electrode 18.

The air electrode 14 advantageously comprises a relatively porous layer (e.g. about 5% to about 40% by volume porous, preferably about 25% to about 35% porous) capable of converting the oxidant O to oxide ions under standard fuel cell operating conditions. The illustrated air electrode 14 has a self-supporting tubular configuration adapted for exposure to the oxidant O and the electrolyte 16, however, other geometries can be used to provide such exposure. The exemplary air electrode 14 has a thickness of about 0.1 mm to about 5 mm, preferably about 1 mm to about 3 mm, and a length of about 0.1 m to about 10 m, preferably about 0.2 m to about 4 m. The air electrode 14 may be made of any material suitable to perform its oxidant ionization function, such as lanthanum manganite doped with one or more of Ca, Sr, Ce, and where one or more rare earth elements can be substituted for at least a portion of the La, and where one or more of Ni, Cr, Fe, Co, Mg can be substituted for at least a portion of the Mn. For example, $La_{1-x-y}Ca_xCe_yMnO_3$, wherein x can range from about 0.2 to about 0.55 and y can range from about 0.02 to about 0.2. Other suitable formulations may also be used, such as those found in U.S. Pat. Nos. 4,562,124, 5,106,706, 5,108,850, 5,342,704, 5,686,198, 5,916,700, and 5,932,146.

The interlayer 15 advantageously comprises an electrically conductive, oxidant permeable material capable of inhibiting degradation of the air electrode 14 by halide vapors and other effects, as well as inhibiting metal diffusion from the air electrode 14 to the electrolyte 16. The interlayer 15 has a configuration that is generally similar to the air electrode 14 and adapted for exposure to the air electrode 14 and the electrolyte 16. The illustrated interlayer 15 forms a layer having a generally tubular configuration that at least partially surrounds the generally tubular air electrode 14, advantageously with an omitted axially extending radial segment 20 (discussed in more detail below), thereby allowing direct contact between the air electrode 14 and interconnect 22 along the segment 20. The segment 20 preferably extends axially along about the entire length of the interlayer 15 and radially about 5 mm to about 15 mm in width. The exemplary interlayer 14 has a thickness of about 0.1 micron to about 10 microns, preferably about 1 micron to about 4 microns. The interlayer 15 may be made of any material suitable to perform its function under fuel cell 10 operating conditions, such as ceria-containing compositions, for example cerium oxide particles doped or admixed with Nb, Ta, Zr, Pr, Nd, Sm, combinations thereof and the like. Other suitable formulations may also be used, such as those described in U.S. Pat. Nos. 4,598,467, 5,106,7075, 5,516,597, 5,993,989 and 6,139,985.

The electrolyte 16 advantageously comprises a relatively dense layer through which oxygen ions can migrate but oxygen gas cannot penetrate, thereby providing good ionic transfer, poor electrical conductivity, and substantially oxygen gas-tight properties. The electrolyte 16 has a configuration that is generally similar to the air electrode 14 and adapted for exposure to the interlayer 15 and the fuel electrode 18. The illustrated electrolyte 16 forms a layer having a generally tubular configuration that at least partially surrounds the generally tubular air electrode 14, advantageously with an omitted axially extending radial segment 20, advantageously with an omitted axially extending radial segment 20, thereby allowing direct contact between the air electrode 14 and interconnect 22 along the segment 20. The segment 20 preferably extends axially along about the entire length of the interlayer 15 and radially about 5 mm to about 15 mm in width, but need not be coextensive with the interlayer segment. The exemplary electrolyte 16 has a thickness of about 0.001 mm to about 1 mm, preferably about 0.01 mm to about 0.1 mm, and a length similar to the air electrode 14. The electrolyte 16 may be made of any material suitable to perform its ion migration and oxygen gas denial functions under fuel cell operating conditions, such as a solid oxides comprising rare-earth element stabilized zirconia doped with one or more elements such as Y or Sc. For example, $Zr_{1-x}Y_xO_z$, wherein x can range from about 0.13 to about 0.26, Z is less than about 2, and x and z are related by the general formula $z=2-x/2$. Other suitable formulations may also be used, such as those found in U.S. Pat. No. 4,609,562.

The fuel electrode 18 advantageously comprises a relatively porous layer (e.g. about 5% to about 40% by volume porous, preferably about 25% to about 35% porous) capable of electrochemically combining the hydrogen-bearing fuel F and oxygen ions to form water and electrons. The fuel electrode 18 has a configuration that is generally similar to the air electrode 14 and adapted for exposure to the electrolyte 16 and the fuel F. The illustrated fuel electrode 18 forms a layer having a generally tubular configuration that at least partially surrounds the generally tubular electrolyte 16, advantageously with an omitted axially extending radial section 21, thereby allowing direct contact between the air electrode 14 and interconnect 22 along the segment 20. The section 21 preferably extends axially along about the entire length of the fuel electrode 18 and radially about 5 mm to about 15 mm in width, although the illustrated section 21 is coextensive with the segment 20 it can have different radial or axial dimensions. The exemplary fuel electrode 18 has a thickness of about 0.001 mm to about 1 mm, preferably about 0.03 mm to about 0.3 mm, and a length similar to the air electrode 14. The fuel electrode 18 may be made of any suitable material to perform its fuel gas ionization and electron release function under fuel cell operating conditions, such as a cermet of Ni, Cu and/or Co with zirconia doped with one or more elements such as Y, Sc and rare earth elements. For example, $Ni/(ZrO_2)_{0.92}(Y_2O_3)_{0.08}$. Other suitable formulations may also be used, such as those described in U.S. Pat. Nos. 4,597,170, 4,609,562, 4,847,172, 4,582,766, 4,971,830, 5,035,962, 5,908,713 and 6,248,468.

Still referring to FIG. 2, an interconnect 22 can be arranged adjacent at least a portion of the air electrode 14, interlayer 15, and electrolyte 16 to transfer the chemically generated electricity from the fuel cell 10 to the overall power generation system 2. The interconnect 22 is preferably dense, electrically conductive and substantially stable in both reducing and oxidizing environments. The illustrated embodiment shows an interconnect 22 arranged along at least a portion of the segment 20 and preferably having a width no greater than the section 21, thereby forming a gap 23 between the fuel electrode 18 to inhibit electrical shorting with the fuel electrode. The interconnect 22 is preferably in direct contact with the air electrode 14, interlayer 15 and electrolyte 16. The exemplary interconnect 22 has a thickness of about 0.01 mm to about 0.5 mm, preferably about 0.03 mm to about 0.1 mm, and a length similar to the air electrode 14. The interconnect 22 may be made of any suitable material to perform its electricity transfer function under fuel cell operating conditions, such as lanthanum chromite doped with one or more elements such as Ca, Sr, Mg, Ba, Co, Ni and Al. For example, $La_{1-x}M_xCr_{1-y}N_yO_3$ wherein M is Ca, Sr or Ba, and N is Mg, Co, Ni or Al, and x can range from about 0.075 to about 0.25, and y can range from about 0.075 to about 0.25. Other suitable formulations may also be used, such as those described in U.S. Pat. Nos. 4,631,238, 4,861,345, 5,143,751, 5,106,654, and 5,426,003.

A top conductive (e.g. nickel, nickel comprising) layer 24 can be deposited onto at least a portion of the interconnect 22 to complete fabrication of the fuel cell 10 and allow the fuel cell 10 to be connected to other fuel cells. The conductive layer 24 is formed on at least a portion of the segment 20 to maximize electrical transfer, but is advantageously radially thinner than the section 21 to provide at least one radial gap 23 that electrically separates the conductive layer 24 from the fuel electrode 18.

Other optional interlayers (not shown) can be arranged between other fuel cell components, such as those disclosed, for example, in U.S. Pat. Nos. 4,598,467 and 5,516,597 and 6,139,985 which are herein incorporated by reference in their entirety.

An optional support tube (not shown) can be used to support to one or more portions of the fuel cell 10. For example, a support tube can underlie the air electrode 14, such as that disclosed in U.S. Pat. No. 4,395,468, which is herein incorporated by reference in its entirety. A support tube may be advantageous if a nonself-supporting, thin or weak layers of air electrode 14, electrolyte 16, and/or fuel electrode 18 are used.

Fuel Cell Fabrication/Assembly

Still referring to FIG. 2, the air electrode 14 is preferably formed as a self-supporting tubular substrate layer. Suitable shaping techniques include extrusion, isostatic pressing, sintering and the like. For example, the processes described in U.S. Pat. Nos. 4,562,124, 5,106,706, 5,108,850, 5,342,704, 5,686,198, 5,916,700, and 5,932,146 can be used. Such an applied air electrode layer can be characterized as being relatively porous to allow the oxide ions to migrate through the air electrode 14.

The interconnect 22 can then be formed onto the air electrode 14 by a variety of techniques, such as by masking all but the segment 20 and then applying the interconnect composition onto the substantially masked air electrode 14 by an APS, VPS, EVD, or sintering method. A segment 20 of interconnect 22 is thereby formed on the underlying air electrode 14.

The interlayer 15 can then be applied onto the electrolyte 14 by removing the previously applied air electrode 14 masking, then masking only the interconnect 22 segment 20, and then applying the interlayer composition onto the segment-masked 20 air electrode 14. By this exemplary method, the interlayer 15 is formed on the underlying tubular air electrode 14 except for the segment 20. As explained above, the interlayer 15 may be made of any suitable material to perform its intended function under fuel cell operating conditions, such as a ceria-containing composition. If a ceria-containing composition is used, one such composition that has been found advantageous is formed from cerium oxide ($CeO_2$) powder. Although, as will be understood by those skilled in the art, other ceria-containing compositions could be used. Also, dopants, additives or constituents could be incorporated into or with the cerium powder or ceria-comprising composition.

If cerium oxide powder is used, suitable powders are commercially available from companies such as Praxair, Inc., as composition number CEO-106. Suitable cerium oxide powders can also be made by commonly understood techniques such as spray drying. One suitable spray drying technique is described in Keith Masters, Spray Drying Handbook, Halsted Press Div., John Wiley and Sons, NY, N.Y. (1985). Another technique that can be used to form suitable cerium oxide powder involves a crushed enfusion, such as the composition commercially available from the Muscle Shoals Mineral company, as composition number CE-99:-25+5.

The cerium oxide powder can then be advantageously mixed or agglomerated to provide a generally freely flowing plasma spray feed powder that can be stored in a supply plenum. The feed powder preferably has a generally uniform and spherical particle size and configuration to assist the generally free-flow, provide more control to the plasma spray gun, and provide a more homogenous applied microstructure. If generally uniform spherical cerium oxide particles are used, most particle sizes preferably range from about 7 microns to about 52 microns in diameter, more preferably from about 11 microns to about 45 microns, and are preferably generally freely flowing. However, particles having various and different sizes and configurations are also suitable, and particles that significantly deviate in size and/or shape from other particles are also suitable. Dopants or additives can be incorporated into or with the cerium oxide feed powder.

Figure 3:
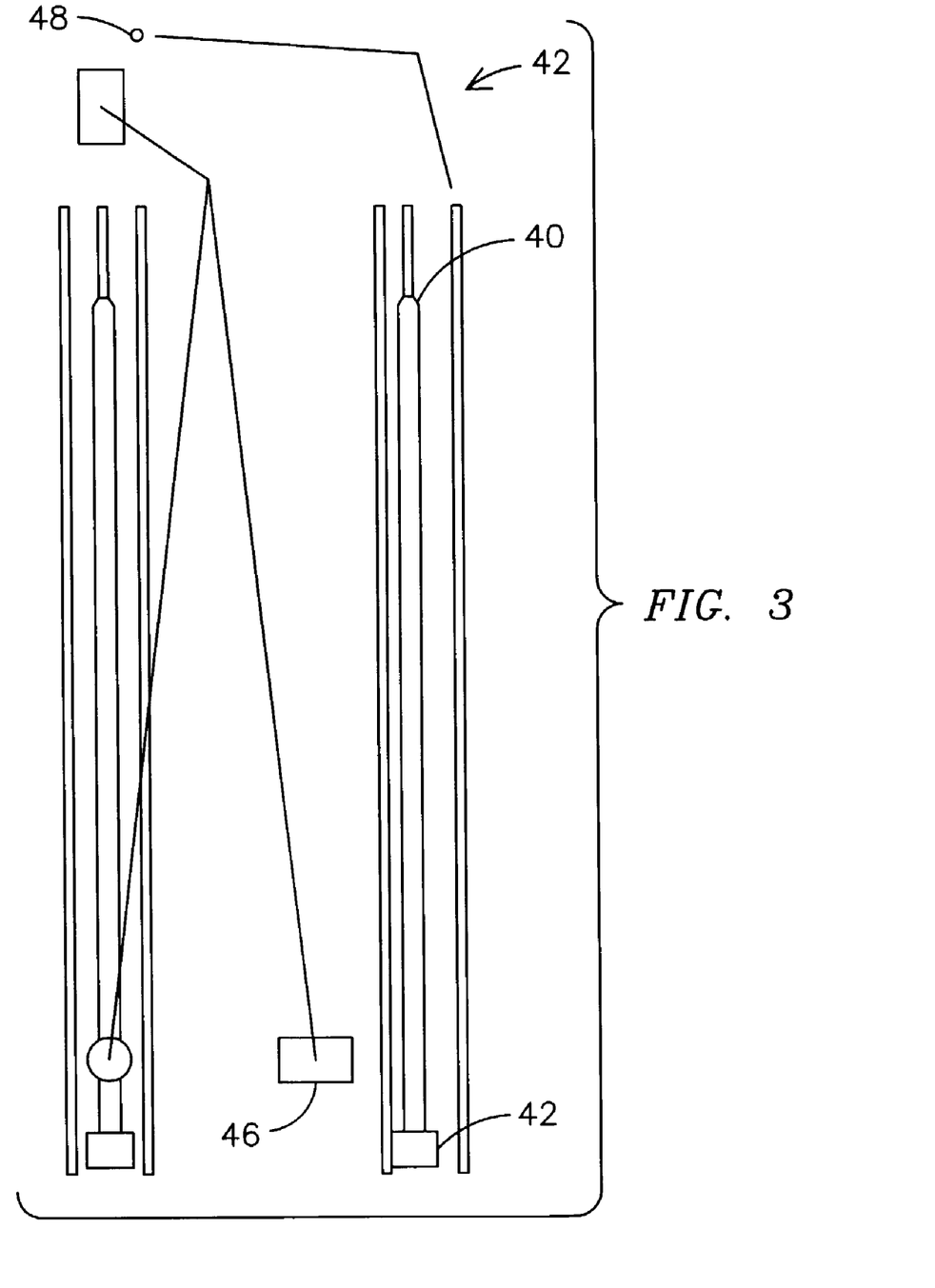
FIG. 3 is a schematic diagram of an exemplary interlayer plasma spraying apparatus.

Referring now to FIG. 3, the air electrode-with-masked-interconnect structure 40 can then be placed in a plasma spray unit 42. The plasma spray unit 42 advantageously comprises a rotatable base 44 and a spaced apart axially traversable spray gun 46. However, as will be understood by those skilled in the art, other mechanisms and arrangements can be used to obtain relative rotation between the base 44 and gun 46 (e.g. rotatable gun), and to obtain relative traverse movement between the base 44 and gun 46 can be used (e.g. axially traverseable base 44). If the exemplary illustrated plasma spray unit 42 is used, the nascent fuel cell 40 can be vertically mounted onto the base 44 and the vertically traverseable gun 46 can be spaced a distance of about 2–4 inches from the nascent fuel cell 40. Also, cooling tubes 48 can be used to inhibit overheating of the nascent fuel cell 40, which can cause cracking or exploding.

In operation, the plamsa spray gun 46 is arced and the interlayer 13 powder material flows from the powder plenum (not shown) to the gun 46. The feed powder is then plasma sprayed (e.g. by APS, VPS, plasma arc spraying, flame spraying, and the like) onto at least a portion of the electrolyte 16, advantageously not onto the masked section 21, to form a generally uniform layer having a microstructure characterized by accumulated molten particle splats. Some background information for general plasma spray techniques can be found in U.S. Pat. Nos. 3,220,068, 4,049, 841, 5,085,742, and 5,426,003, and those skilled in the art will recognize and understand other plasma spray techniques.

If an APS technique is used, it has been found that a suitable plasma spray can be generated by an arc discharge having a voltage of about 30 volts to about 60 volts, a current of about 400 amperes to about 900 amperes, and a power of about 10 kilowatts to about 30 kilowatts. Particle melting discharge temperatures can range from about 1000° C. to about 1800° C., preferably about 1500° C., and the powder feed rate is advantageously about 4 grams/minute to about 30 grams/minute. A commercially available spray gun suitable to achieve these parameters is a Praxair Tafa Plasma Spray Gun, Model No. SG-100–730. The distance between the spray gun nozzle and the electrolyte layer 16 is about less than 4 inches, preferably about 2 inches to about 3 inches. The plasma should be directed substantially perpendicular to the electrolyte layer 16, since low angle spraying tends to exaggerate the resultant porosity. It has also been found advantageous to direct traverse of the spray gun along the axial length of the nascent fuel cell at a generally constant velocity of about 400 mm/sec to about 700 mm/sec, preferably about 550 mm/sec, and to rotate the nascent fuel cell 40 about 10–15° degrees, preferably about 12°, after each pass of the spray gun 42 such that thirty passes of the spray gun 42 are used to constitute one compete 360° revolution of the nascent fuel cell 42. It has been found that two such 360° revolution applications of the ceria-containing interlayer 15 provides a suitably uniform and effective interlayer 15. The interlayer advantageously has a generally uniform thickness on the surface of the air electrode 14 of about 0.1 micron to about 10 microns and preferably about 1–4 microns, and has a weight of about 0.2 gram to about 2 grams, preferably about 0.5–1.5 grams.

As will be understood by those skilled in the art, by varying one or more of the above parameters, such as the number of revolutions of the nascent fuel cell 40, the powder flow rate, spray distance, number of steps per rotation, and/or the traverse speed of the gun 42, the processing time for an individual nascent fuel cell 40 can be varied for a given thickness requirement. Similarly, by varying one or more of the above parameters, the applied layer thickness can be varied while maintaining a constant processing time.

The molten particles that form the interlayer 15, when applied to the nascent fuel cell 40 via the above-described plasma spray process, adhere well since they are not merely held in place by weak attractive forces or a binder that typically require careful subsequent processing of the nascent fuel cell 40. Also, the particles are substantially uniformly applied over the entire nascent fuel cell 40, and not dependent upon certain fuel cell 10 properties such as porosity, as would be the case if the interlayer 15 was applied via an infiltration technique.

After the interlayer 15 has been applied onto the nascent fuel cell 40, the electrolyte 16 can be then applied onto the interlayer 15, such as by keeping the previously applied segment-masked 20 masking on the nascent fuel cell, and then applying the electrolyte composition onto the segment-masked 20 interlayer 15. By this exemplary method, the electrolyte 16 is formed on the underlying tubular air electrode 14 except for the segment 20. Advantageously the electrolyte is applied by a plasma spray process that does not remove the interlayer 15. Applicants have found that plasma spraying the electrolyte 16 under generally similar parameters as explained above in connection with the plasma sprayed interlayer can achieve this interlayer 15 non-removal aim, but with a electrolyte 16 target thickness of about 30–45 microns and a powder feed rate of about 25–30 grams.

A fuel electrode layer 18 advantageously comprising nickel cermet can then be formed onto the electrolyte by a variety of techniques, such as masking the section 21 and then applying the fuel electrode 18 composition onto the section-masked 21 nascent fuel cell by a variety of techniques such as EVD, sintering, and plasma spraying.

A top conductive (e.g. nickel, nickel comprising) layer 24 can be deposited onto the interconnect 22 to complete fabrication of the fuel cell 10.

Figure 4:
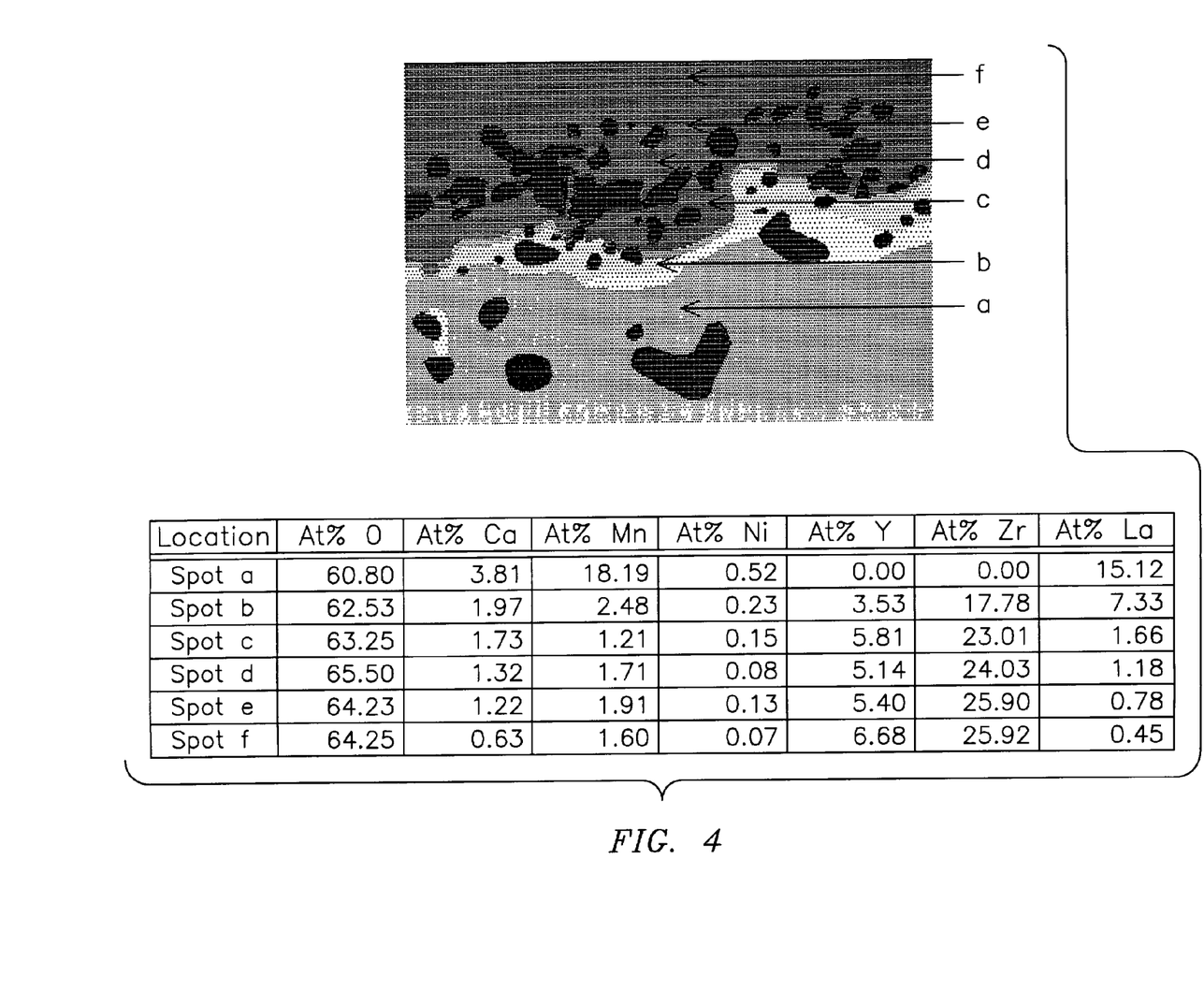
FIG. 4 is an exemplary photograph of the microstructure of a plasma sprayed interlayer deposited onto an underlying air electrode.

Referring to FIG. 4, a micrograph of a plasma sprayed interlayer 15 deposited onto an underlying air electrode 14 and with a plasma sprayed electrolyte 16 applied over the interlayer 15 is shown. The infiltration of the ceria from the ceria-containing interlayer 15 into the air electrode 14 is readily seen.

Figure 5:
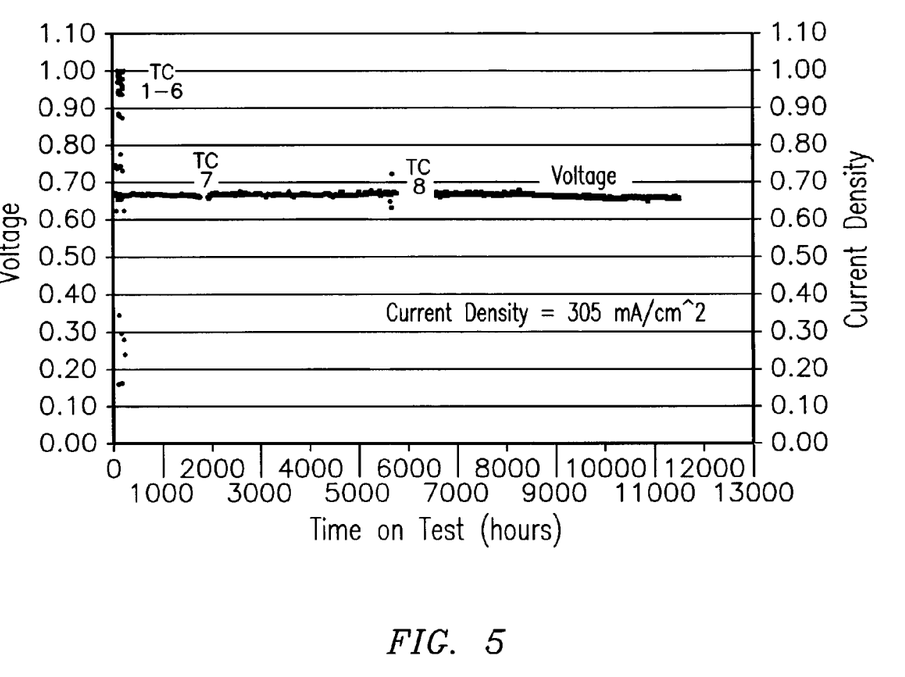
FIG. 5 is a graph showing stable operation of the exemplary fuel cell comprising an air plasma sprayed ceria-containing interlayer.

FIG. 5 is a graph showing stable operation of an exemplary fuel cell comprising an air plasma sprayed interlayer 13, the fuel cell having a higher current density and reduced degradation over time.

Fuel Cell Power Generation System

Figure 6:
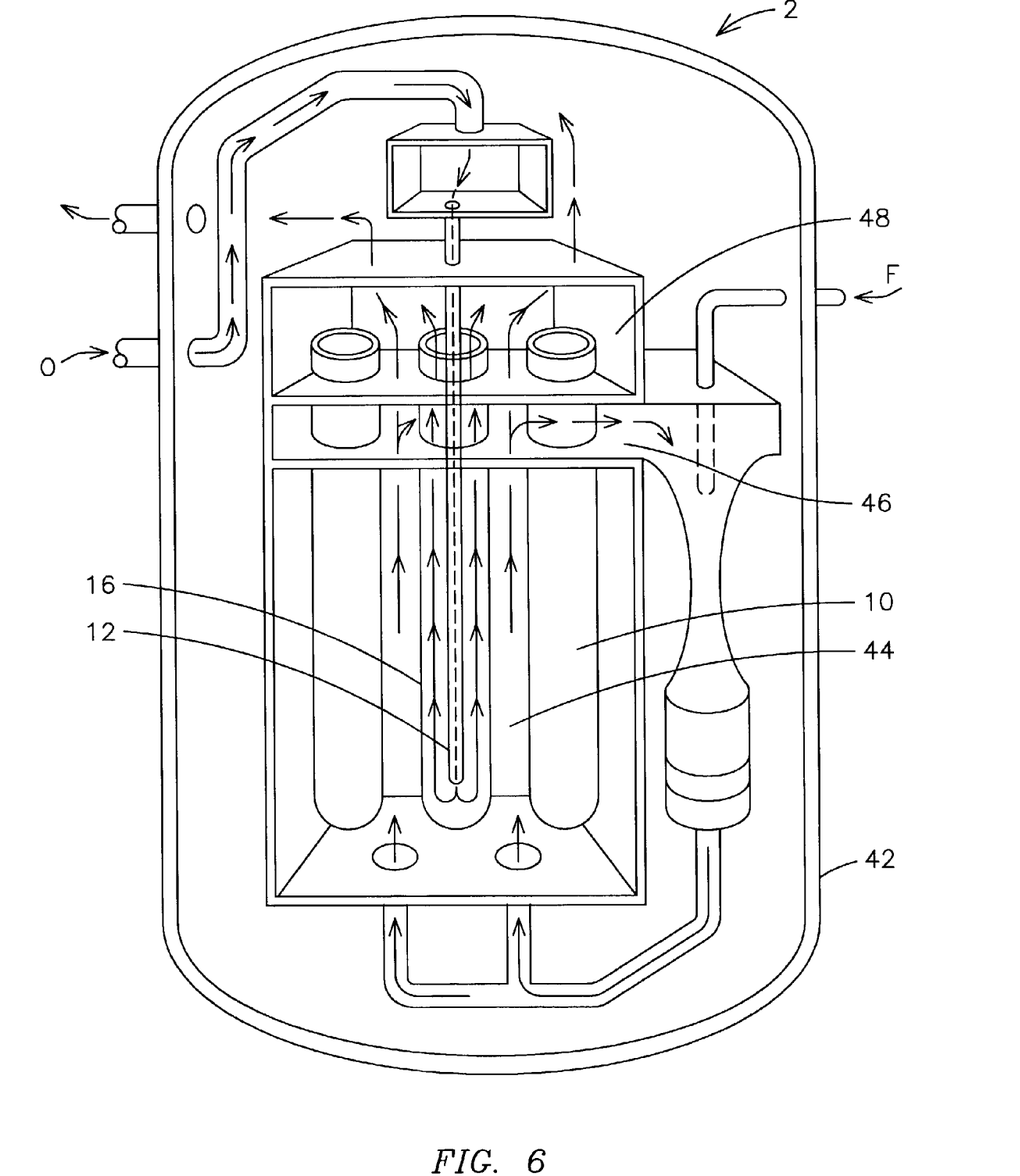
FIG. 6 is a schematic diagram of an exemplary solid oxide fuel cell electrical power generation system.

Referring now to FIG. 6, an exemplary solid oxide fuel cell (SOFC) power generation system 2 is shown. A plurality of individual fuel cells 10 are bundled or otherwise interconnected by a conductor such as a metal, metal-based or conductive plate, fiber, felt or interconnect to provide a desired system voltage and current, such as that described in U.S. Pat. No. 4,395,468, previously incorporated by reference. A suitable fuel cell interconnection technique involves bundling the fuel cells in series and/or parallel into on one or more electrically interconnected arrays and/or submodules.

The exemplary system 2 comprises a housing 52 that contains a fuel inlet or generating chamber/section 54, a combustion product or preheating chamber/section 56, and an oxidant or air inlet chamber/section 58. As will understood by those skilled in the art, the exemplary illustrated system can use more or less than the three chambers/sections, and can combine or divide the functionality of the three chambers/sections.

The illustrated fuel cells 10 extend from the air inlet chamber 58 to the generating chamber 54, with an open end in the air inlet chamber 58 and a closed end in the generating chamber 54, and the air electrode 14 on the inner periphery and the fuel electrode 18 on the outer periphery.

The oxidant O advances through the air inlet and preheating chambers 58, 56 and into the generating chamber 54, where it O is introduced to the air electrode 14 portion of the fuel cell 10. Meanwhile, the fuel F advances into the generating chamber 54 and is introduced to the fuel electrode 18 portion of the fuel cell 10. The oxidant and fuel O, F then undergo the previously described electrochemical reaction within the fuel cell 10. The reaction products, and any depleted oxidant O and fuel F, are then discharged or diffused from the generating chamber 54 to the combustion product chamber 56, where they can be discharged from the system, recycled to preheat the incoming oxidant or fuel, or used for other purposes such as powering a steam turbine, and the like.

Although this invention has been described in terms of certain exemplary uses, preferred embodiments, and possible modifications thereto, other uses, embodiments and possible modifications apparent to those of ordinary skill in the art are also within the spirit and scope of this invention. It is also understood that various aspects of one or more features of this invention can be used or interchanged with various aspects of one or more other features of this invention. Accordingly, the scope of the invention is intended to be defined only by the claims that follow.

What is claimed is:

1. A fuel cell, comprising:
   an air electrode and a fuel electrode;
   an electrolyte arranged between the air electrode and the fuel electrode; and
   a plasma sprayed interlayer comprising spray particles with a size of about 7 microns to about 52 microns disposed between the air electrode and the electrolyte, the interlayer having a thickness of about 0.1 micron to about 10 microns and weighting about 0.2 gram to about 2 grams, and formed of molten particle splats that adhere to the air electrode wherein the interlayer comprises a ceria-containing composition.

2. The fuel cell of claim 1, wherein the ceria-containing composition comprises cerium oxide particles.

3. The fuel cell of claim 2, wherein the cerium oxide particles is in compound or admixed with niobium and/or tantalum.

4. The fuel cell of claim 2, wherein most of the cerium oxide particles are spherical and have a diameter size of about 7 microns to about 52 microns and are freely flowing.

5. The fuel cell of claim 2, wherein most of the cerium oxide particles have a size of about 11 microns to about 45 microns.

6. The fuel cell of claim 1, wherein a spray gun is used to dispose the interlayer onto the air electrode.

7. The fuel cell of claim 6, wherein the spray gun generates an arc discharge having a voltage of about 30 to 60 volts, a current of about 400 to 900 amperes, and a power of about 15 to 25 kilowatts.

8. The fuel cell of claim 6, wherein the spray gun discharge temperatures is between 1000–1800° C.

9. The fuel cell of claim 6, wherein the spray gun discharges a ceria-containing composition to form the interlayer on the air electrode at a speed of about 500–600 mm/s.

10. The fuel cell of claim 6, wherein the interlayer comprises cerium oxide particles in powder form that are feed to die spray gun at a rate of about 6–20 grams per minute.

11. The fuel cell of claim 6, wherein the spray gun is spaced a distance of about less than 4 inches from the air electrode.

12. The fuel cell of claim 6, wherein the spray gun moves at least 40 meters per minute when disposing the interlayer onto the air electrode.

13. The fuel cell of claim 6, wherein the spray gun makes a plurality of passes along an axial length of the air electrode to dispose the interlayer onto to air electrode.

14. The fuel cell of claim 6, wherein the axial length of the air electrode is rotated about 10–15° after each pass of the spray gun.

15. A fuel cell, comprising:
an air electrode;
a plasma sprayed interlayer comprising spray particles with a size of about 7 microns to about 52 microns disposed on at least a portion of the air electrode having a thickness of about 0.1 micron to about 10 microns wherein the interlayer comprises a ceria-containing composition;
a plasma sprayed electrolyte disposed on at least a portion of the interlayer; and
a fuel electrode disposed on at least a portion of the electrolyte.

16. The fuel cell of claim 15, wherein the interlayer comprises cerium oxide particles in powder form that are disposed by a spray gun.

17. The fuel cell of claim 16, wherein the electrolyte comprises rare-earth element stabilized zircorila particles in powder form that are disposed by a spray gun.

18. A method of manufacturing a fuel cell, comprising:
providing an air electrode;
plasma spraying an interlayer comprising spray particles with a size of about 7 microns to about 52 microns onto at least a portion of the air electrode wherein the interlayer comprises a ceria-containing composition;
plasma spraying an electrolyte onto at least a portion of the interlayer; and
applying a fuel electrode onto at least a portion of the electrolyte to fabricate the fuel cell.

19. The method of claim 18, wherein the interlayer comprises cerium oxide particles in powder form that are disposed onto at least a portion of the air electrode by a spray gun.

20. The method of claim 19, wherein the electrolyte comprises rare-earth element stabilized zirconia particles in powder form that are disposed onto at least a portion of the interlayer by a spray gun.

* * * * *